United States Patent [19]

Kageyama

[11] Patent Number: 5,166,987
[45] Date of Patent: Nov. 24, 1992

[54] ENCODING APPARATUS WITH TWO STAGES OF DATA COMPRESSION

[75] Inventor: Koji Kageyama, Kanagawa, Japan
[73] Assignee: Sony Corporation, Tokyo, Japan
[21] Appl. No.: 677,575
[22] Filed: Mar. 29, 1991

[30] Foreign Application Priority Data

Apr. 4, 1990 [JP] Japan .................................. 2-89371
Apr. 4, 1990 [JP] Japan .................................. 2-89372

[51] Int. Cl.$^5$ ..................... H04N 1/415; H04N 1/417
[52] U.S. Cl. ...................................... 382/56; 358/426; 358/430; 358/433
[58] Field of Search .............. 382/56; 358/426, 261.1, 358/261.2, 429, 430, 432, 433

[56] References Cited

U.S. PATENT DOCUMENTS

| | | |
|---|---|---|
| 4,196,448 | 4/1980 | Whitehouse et al. ............... 358/135 |
| 4,703,352 | 10/1987 | Kondo .................................. 358/135 |
| 4,710,811 | 12/1987 | Kondo .................................. 358/135 |
| 4,788,598 | 11/1988 | Ochi et al. ............................ 358/260 |
| 5,021,891 | 6/1991 | Lee ...................................... 358/432 |
| 5,046,121 | 9/1991 | Yonekawa et al. ................... 382/56 |
| 5,051,840 | 9/1991 | Watanabe et al. ................... 358/433 |
| 5,063,608 | 11/1991 | Siegel ................................... 382/56 |

FOREIGN PATENT DOCUMENTS

0244160 12/1985 Japan .................................. 358/430
0002721 1/1987 Japan .................................. 382/56

*Primary Examiner*—Leo H. Boudreau
*Assistant Examiner*—Andrew W. Johns
*Attorney, Agent, or Firm*—Alvin Sinderbrand; William S. Frommer

[57] ABSTRACT

In a highly efficient encoding apparatus, image data are encoded by multiple encoding techniques so as to obtain highly compressed image data. For example, a block segmentation circuit segments received digital image data into a plurality of relatively small blocks each having a plurality of pixels, and such small blocks are encoded by a block encoding circuit so as to compress the pixel data in each of the small blocks. The output data of the block encoding circuit are encoded by a predictive encoding circuit so as to obtain highly compressed image data.

3 Claims, 8 Drawing Sheets

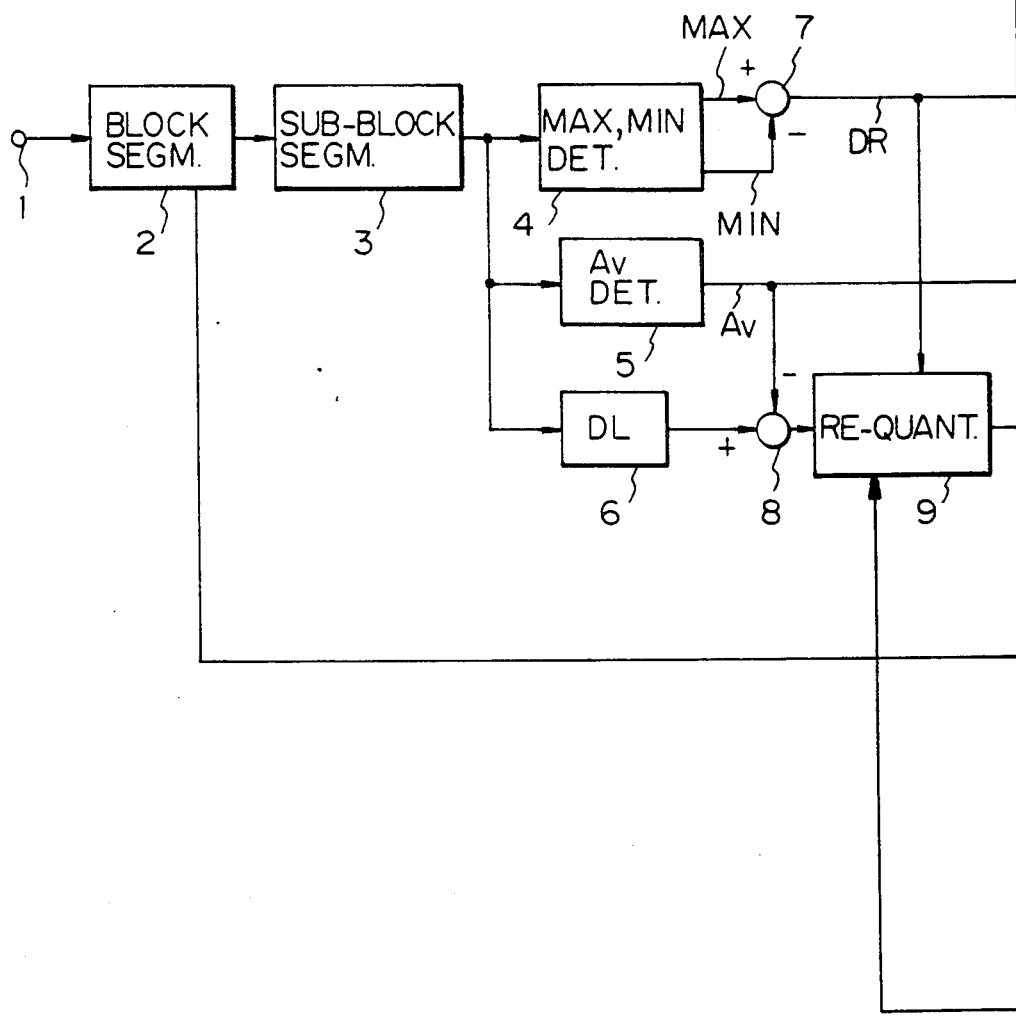

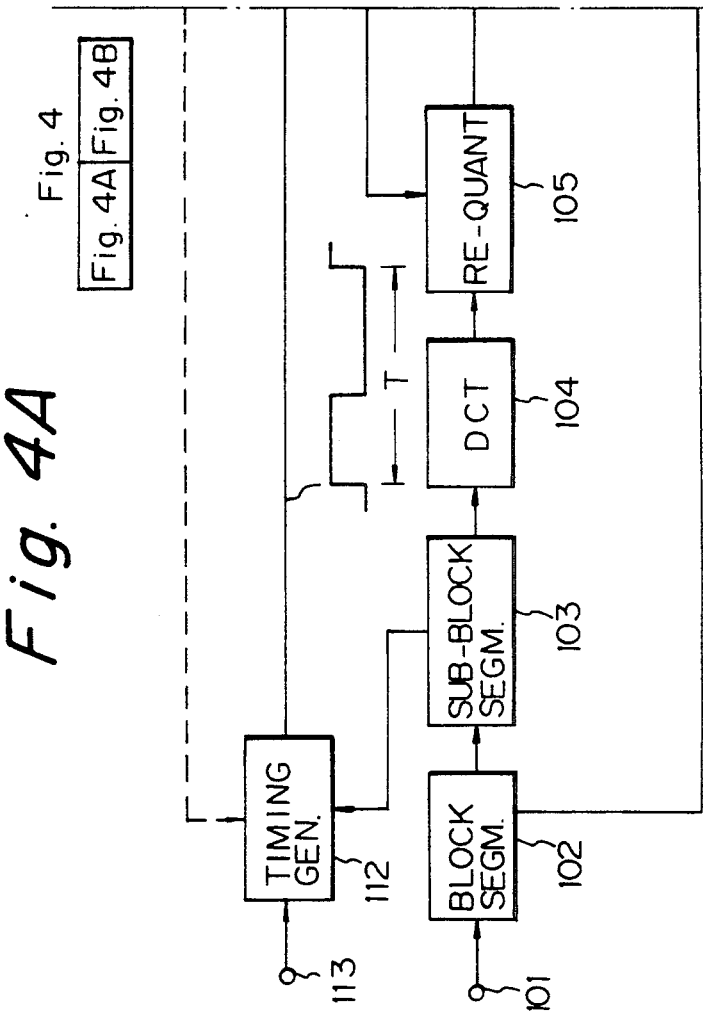

ENCODING APPARATUS WITH TWO STAGES OF DATA COMPRESSION

BACKGROUND OF THE INVENTION

1. Field of the Invention

The present invention relates to a highly efficient encoding apparatus for encoding image signals having a relatively large data or information content such as high definition television signals.

2. Description of the Prior Art

The applicant of the present invention has proposed an adaptive encoding apparatus for obtaining a dynamic range, which is the difference between a maximum value and a minimum value, of a plurality of pixels contained in a 2-dimensional block and for adaptively encoding the pixel data of the block in accordance with the dynamic range. This apparatus is disclosed in Japanese Patent Laid-Open Publication No. SHO 61-144989.

Further, disclosed in Japanese Patent Laid-Open Publication No. SHO 62-92620 is an adaptive encoding apparatus for adaptively encoding data in accordance with the dynamic range of a 3-dimensional block of pixels formed from a plurality of frames. Moreover, disclosed in Japanese Patent Laid-Open Publication No. SHO 62-128621 is a variable length encoding method for varying the number of bits in accordance with the dynamic range so that the maximum distortion due to quantization remains constant.

The above mentioned encoding technique utilizing the dynamic range (hereinafter, named ADRC) can remove level redundancy and decrease the number of bits per pixel so that the amount of data to be transmitted can be compressed.

Further, a predictive encoding technique is known in which the value of a current pixel is predicted by means of the value of an encoded pixel and in which a predictive error, that is, an error between the true value of the current pixel and the predictive value, is transmitted. This predictive encoding technique enables the amount of data to be transmitted to be compressed.

In another highly efficient encoding technique known as a 2-dimensional DCT (Discrete Cosine Transform) technique, an image is divided into blocks, each block is orthogonally transformed, and the resultant coefficient data is quantized. The coefficient data are divided into a DC component and a high frequency component. Typically, the value of the DC component is relatively large, while the value of the high frequency component is substantially smaller. By assigning a particular number of bits to each component, the total number of bits can be decreased in comparison with the number of bits of the original data.

However, even if one of the above mentioned ADRC, DCT or predictive encoding techniques is used, the data compression ratio may not be satisfactory. Further, if the compression ratio is increased, the quality of the decoded image becomes poor.

OBJECTS AND SUMMARY OF THE INVENTION

Accordingly, it is an object of the present invention to provide a highly efficient encoding apparatus which avoids the above-mentioned disadvantages of the prior art.

More specifically, it is an object of the present invention to provide a highly efficient encoding apparatus utilizing ADRC or orthogonal transformation encoding such as DCT and predictive encoding.

According to an aspect of the present invention, a highly efficient encoding apparatus for encoding digital video data comprises: block segmentation means for receiving the digital video data in a raster scan format and for transforming the received data into a format having blocks of pixel data, first encoding means for receiving the blocks of pixel data and for encoding and compressing the pixel data in each of the blocks, second encoding means for predictively encoding and compressing data outputted from the first encoding means, and means for outputting encoded and compressed data from the second encoding means.

The above, and other objects, features and advantages of the present invention, will be apparent in the following detailed description of the preferred embodiments of the present invention when read in conjunction with the accompanying drawings in which corresponding parts are identified by the same reference numerals.

BRIEF DESCRIPTION OF THE DRAWINGS

FIG. 1 is a diagram showing the manner in which FIGS. 1A and 1B are to be read together;

FIGS. 1A and 1B, when read together, are a block diagram of a highly efficient encoding apparatus according to an embodiment of the present invention;

FIG. 4 is a diagram showing the manner in which FIGS. 4A and 4B are to be read together;

FIGS. 4A and 4B, when read together, are a block diagram of a highly efficient encoding apparatus according to another embodiment of the present invention;

DETAILED DESCRIPTION OF THE PREFERRED EMBODIMENTS

Embodiments of the present invention will now be described with reference to the accompanying drawings. FIG. 1 is a block diagram of a highly efficient encoding apparatus according to an embodiment of the present invention. As shown therein, digital video data, in which each digitized data sample has 8 bits, are supplied through an input terminal 1 to a block segmentation circuit 2. A data array of the video data is transformed from a raster scan order or format to a block format by block segmentation circuit 2. For example, a screen of one frame or one field may be divided into a block of (4×4=16) pixels, as shown in FIG. 2A. An output signal of the block segmentation circuit 2 is supplied to a sub-block segmentation circuit 3 so as to form sub-blocks. As an example, the sub-block segmentation circuit 3 may form four sub-blocks, as shown in FIG. 2B, from the block shown in FIG. 2A.

Figure 2A:
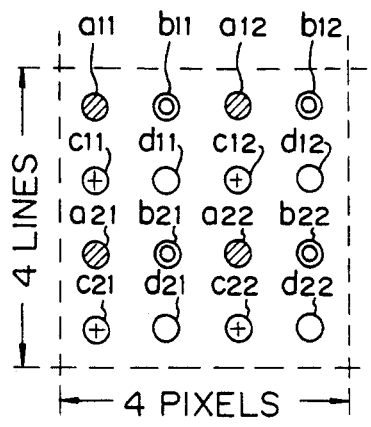
FIGS. 2A and 2B are diagrams of a structure of a block and a sub-block, respectively.
Figure 2B:
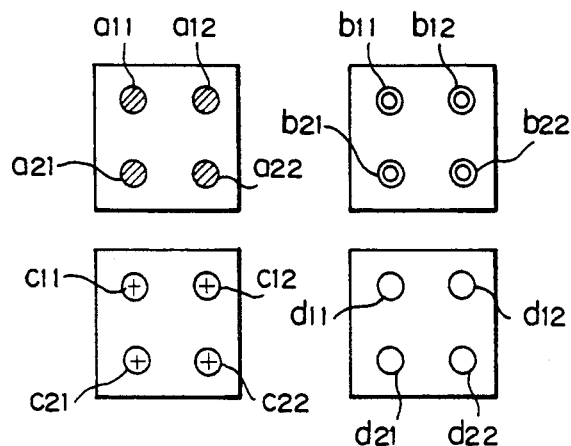

Each sub-block shown in FIG. 2B is composed of four pixels, that is, (a11 to a22, b11 to b22, c11 to c22, and d11 to d22), respectively. The sub-block segmentation circuit 3 outputs the pixel data in the order of a11, a12, a21, a22, b11, ..., d21, and, d22. As an alternative to using separate independent circuits, for the block segmentation circuit 2 and the sub-block segmentation circuit 3, a memory device may be used for forming sub-blocks of data from the input data.

An output signal of the sub-block segmentation circuit 3 is supplied to an ADRC encoding circuit, whereupon each sub-block is ADRC encoded. More specifically, video data from the sub-block segmentation circuit 3 is supplied to a maximum/minimum value detection circuit 4, an average value detection circuit 5, and a delay circuit 6. The detection circuit 4 detects a maximum value MAX and a minimum value MIN of the data in the sub-block. The average value detection circuit 5 determines the average value Av of the four pixels in the sub-block. The delay circuit 6 delays the data received from circuit 3 until the maximum value MAX, the minimum value MIN, and the average value Av are detected or determined as previously described. A subtraction circuit 7 performs the arithmetic operation of (MAX-MIN) so as to obtain the dynamic range DR of the sub-block and outputs the same.

Data outputted from the delay circuit 6 and the average value Av from the average value detection circuit 5 are supplied to a subtraction circuit 8, whereupon the subtraction circuit subtracts the average value Av from the data supplied from the delay circuit, thereby obtaining normalized pixel data. As is to be appreciated, the pixel data can be also normalized by subtracting the maximum value or the minimum value of the data of the sub-block from the data supplied from the delay circuit 6. The normalized pixel data from the subtraction circuit 8 and the dynamic range DR from subtraction circuit 7 are supplied to a requantizing circuit 9, whereupon a code signal DT having n bits is generated. The number of bits in the code signal DT is smaller than the number of bits in the received video data which, as previously mentioned, is 8 bits. The requantizing circuit 9 quantizes the video data in accordance with the dynamic range DR. In other words, the requantizing circuit 9 divides the video data, which is normalized, by a quantizing step ($\Delta$), which is obtained by dividing the dynamic range D by ($2^n$), rounds off the quotient, and outputs the resultant integer value as a code signal DT. The requantizing circuit 9 can be also formed using a division circuit or a ROM.

The above mentioned ADRC encoding is performed on each sub-block in a time-division manner. The code signal DT from the requantizing circuit 9 and the additional data, that is, the dynamic range DR and the average value AV, are further compressed by predictive encoding circuits in the next stage as hereinafter described.

Memories 10A, 10B, 10C and 10D are provided for the code signal DT, whereas memories 11A, 11B, 11C and 11D are provided for the additional data, as hereinafter described. Each of the memories 10A to 10D has a storage capacity of (n bits$\times$4). On the other hand, each of the memories 11A to 11D has a storage capacity of (8 bits$\times$2=16 bits). The memories 10A, ..., and 11D are cleared block by block with a clear pulse supplied from the block segmentation circuit 2.

A code signal corresponding to the pixels a11, ... a22, from the requantizing circuit 9, is written to the memory 10A. An output signal read from the memory 10A is supplied to a variable length coding circuit 12 which, for example, may utilize a run-length Huffman encoding or the like. Thereafter, a code signal corresponding to pixels b11, ... b22, from the requantizing circuit 9, is written to the memory 10B. The pixels a11, a12, ... read from the memory 10A are supplied to a subtraction circuit 13 in synchronization with pixels b11, b12 ... read from the memory 10B, whereupon the subtraction circuit 13 performes the arithmetic operation of (bij$-$aij) in which (i: 1, 2, j: 1, 2) so as to obtain a predictive error ($\Delta$) bij. The predictive error ($\Delta$) bij is supplied to the variable length coding circuit 12.

Likewise, a code signal corresponding to the pixels c11, ... c22, from the requantizing circuit 9, is written to the memory 10C. The pixels a11, a12, ... read from the memory 10A are supplied to a subtraction circuit 14 in synchronization with pixels c11, c12 ... read from memory 10C, whereupon the subtraction circuit 14 performs a subtraction of (cij$-$aij), in which i=1, 2 and j=1, 2, so as to obtain a predictive error ($\Delta$) cij. The predictive error ($\Delta$) cij is supplied to the variable length coding circuit 12.

A code signal corresponding to the pixels d11, ... d22, is written to the memory 10D. The code signal read from the memory 10D and the code signals read from the memories 10A, 10B, and 10C are supplied to an adaptive predictive encoding circuit 15. The adaptive predictive encoding circuit 15 generates a predictive error ($\Delta$) dij and an ID signal which identifies the most suitable predictive coefficient. The predictive error $\Delta$ dij and the ID signal are supplied to the variable length coding circuit 12.

Figure 1B:
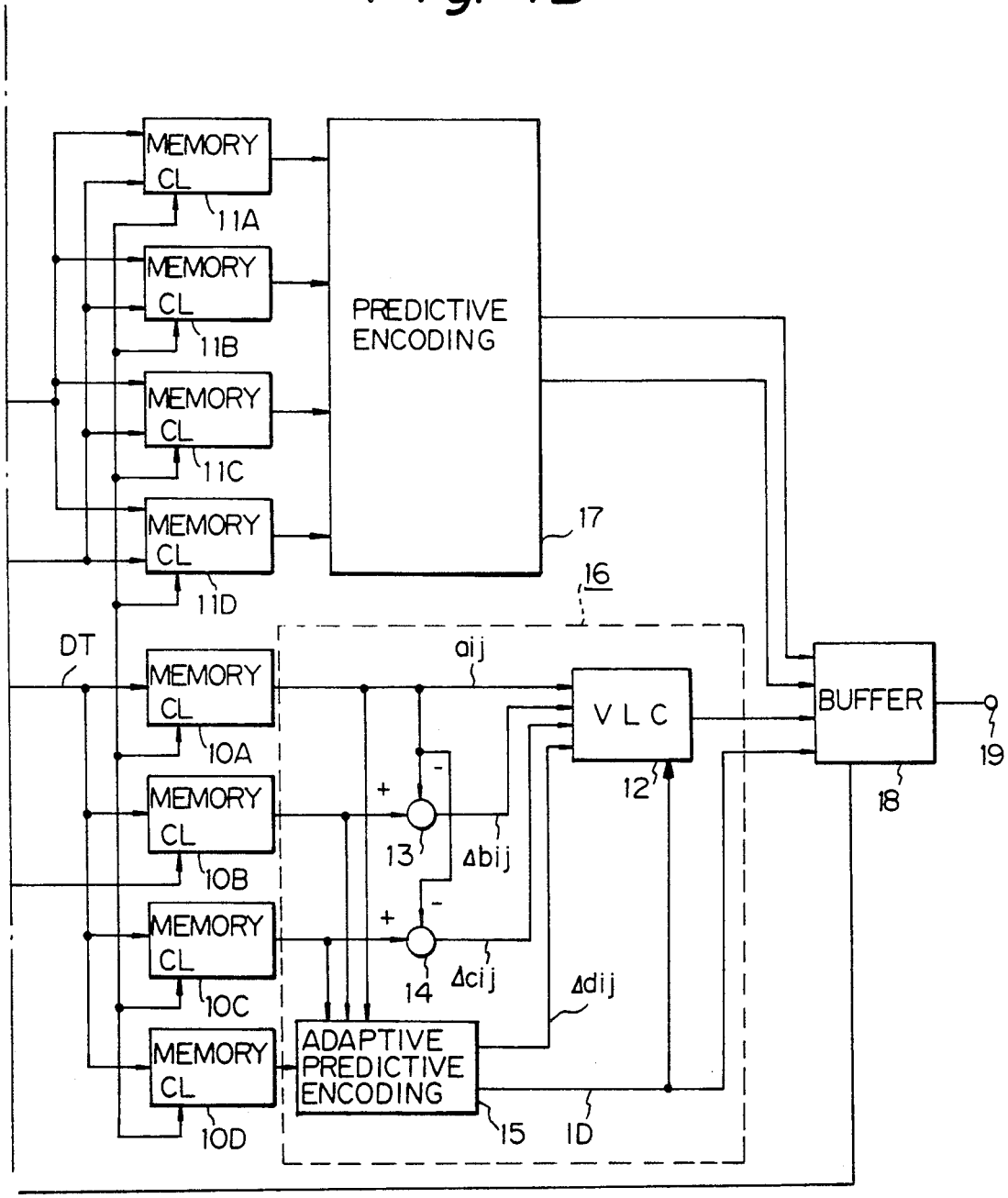

The predictive encoding circuit 17 encodes the additional data (that is, the dynamic range DR and the average value Av) in a substantially equivalent manner to that performed by the predictive encoding circuit 16 which encodes the code signal DT, as previously described, and which is shown by a box with a dashed line in FIG. 1B. As shown therein and as previously described, the predictive encoding circuit 16 includes the variable length coding circuit 12, the subtraction circuits 13 and 14, and the adaptive predictive encoding circuit 15.

Output signals of the predictive encoding circuits 16 and 17 are supplied to a buffer circuit 18. Data to be transmitted are obtained at an output terminal 19 of the buffer circuit 18. Although details of the buffer circuit 18 are not shown, the buffer circuit 18 monitors the amount of data being generated and generates a control signal which is utilized for maintaining the amount of data generated constant. More specifically, the control signal is used to control the width of the quantization step of the requantizing circuit 9 rather than using the fixed length ADRC. When the variable length ADRC is performed, the amount of data being generated is kept constant, by controlling a threshold value utilized for determining the number of bits of the code signal.

The encoding operation performed by the predictive encoding circuit 16 will now be described. The predictive encoding is performed with a set of four pixels (aij, bij, cij, and dij) which are adjacently disposed in a block as, for example, shown in FIG. 2A. As a result, an encoded output (aij, ($\Delta$) bij, ($\Delta$) cij, ($\Delta$) dij) is generated. In other words, if the reference numerals assigned to the pixels represent the values of code signals of the pixels, the predictive errors generated in the substraction circuits 13 and 14 and the adaptive predictive encoding circuit 15 can be expressed by the following equations:

$$(\Delta)bij = bij - \overline{bij}$$

$$(\Delta)cij = cij - \overline{cij}$$

$$(\Delta)dij = dij - \overline{dij}$$

in which, $$\overline{bij} = aij$$

$$\overline{cij} = aij$$

$$\overline{dij} = (\alpha)aij + (\beta)bij + (\gamma)cij$$

As is to be appreciated, the pixels bij and cij are respectively located at a more right position by one sample and at a lower position by one line than the pixel aij. As a result, there is relatively strong correlation between the pixels aij and bij and between the pixels aij and cij. Thus, the value of aij may be used as a predictive value of the pixels bij and cij. However, since the pixel dij is located at a lower and oblique position relative to the pixel aij, the correlation between the pixel dij and the pixel aij is weaker than that between the pixels bij and cij and the pixel aij. As a result, optimum predictive coefficients ($\alpha$), ($\beta$), and ($\gamma$) are multiplied by three pixels in the vicinity of the pixel dij, as previously described, whereupon the resultant value is used as a predictive value dij'.

Figure 3:
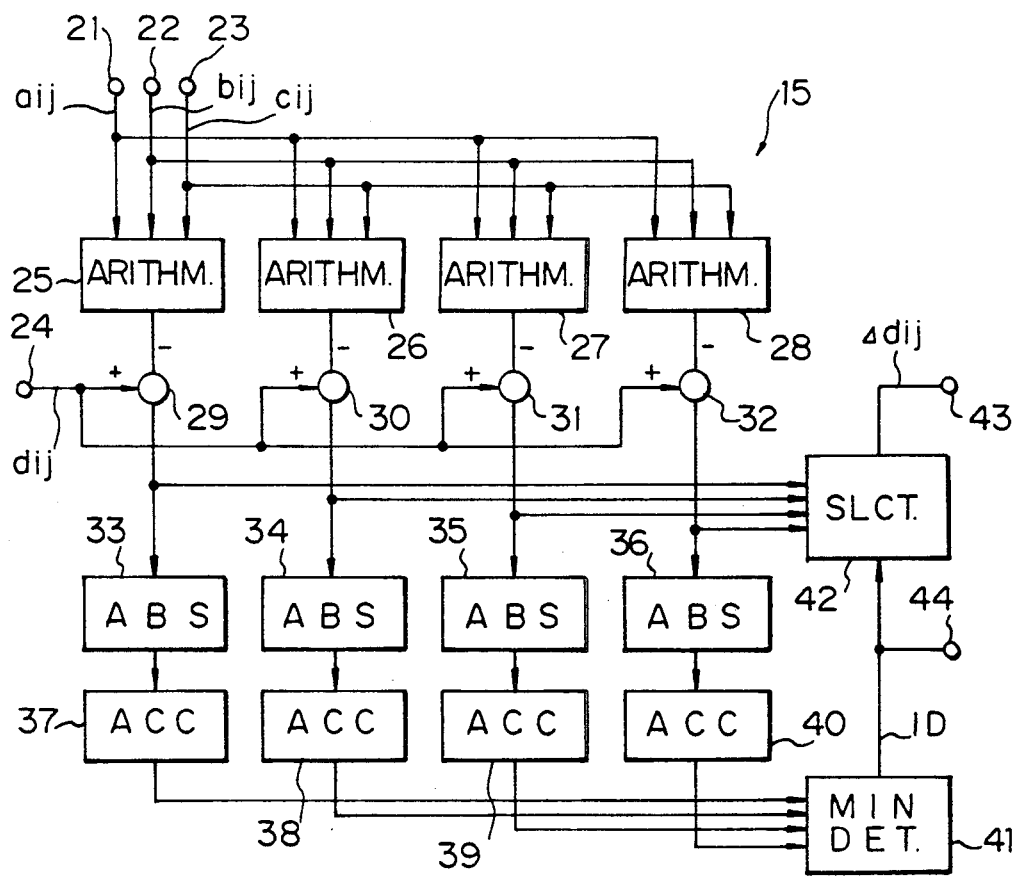
FIG. 3 is a block diagram of an adaptive predictive encoding circuit.

FIG. 3 is a block diagram exemplifying the adaptive predictive encoding circuit 15. Code signals of the pixels aij, bij, cij, and dij are supplied to input terminals 21, 22, 23, and 24, respectively. Signals from input terminals 21, 22 and 23; are each supplied to arithmetic circuits 25, 26, 27 and 28, whereupon predictive values are formed with different predictive coefficients. In other words, the following equations are respectively obtained from the arithmetic circuits 25 to 28:

$$dij'1 = (\alpha)1aij + (\beta)1bij + (\gamma)1cij$$

$$dij'2 = (\alpha)2aij + (\beta)2bij + (\gamma)2cij$$

$$dij'3 = (\alpha)3aij + (\beta)3bij + (\gamma)3cij$$

$$dij'4 = (\alpha)4aij + (\beta)4bij + (\gamma)4cij$$

These predictive values are respectively supplied to subtraction circuits 29, 30, 31 and 32 so as to be substracted from (or compared to) the true value dij signal supplied from input terminal 24. The differential output signals of the subtraction circuits 29 to 32, or the predictive errors, are respectively converted into absolute values by absolute value circuits 33, 34, 35, and 36 and then sent to accumulators 37, 38, 39, and 40, so as to accumulate the predictive errors in absolute values in the block. The output signals from the accumulators 37 to 40 are supplied to a minimum value detection circuit 41, whereupon a minimum value is detected therefrom. A 2-bit ID signal, which identifies the minimum value by utilizing the corresponding predictive coefficient, is generated by the minimum value detection circuit 41 and outputted to an output terminal 44 and a selector 42.

Predictive errors outputted from the subtraction circuits 29 to 32 are further supplied to the selector 42. The selector 42 holds the four types of predictive errors according to the predictive coefficients and selects one of the predictive errors in accordance with the ID signal supplied from the minimum value detection circuit 41. Thus, a minimum predictive error formed with the corresponding predictive coefficient is selected by the selector 42 and outputted as a predictive error ($\Delta$) dij from an output terminal 43 of the selector 42.

Similarly, the additional data, that is, the dynamic range DR and the average value Av, of each sub-block may have correlation therebetween so that the additional data can be predictively encoded like the pixel data, as previously described. The predictive encoding of the additional data is performed by the predictive encoding circuit 17. However, since the predictive encoding circuit 17 is structured and operated in a substantially similar manner to the previously described predictive encoding circuit 16, a detailed description is omitted.

On the decoding side, processing is performed in a substantially reverse manner as that for the encoding operation. More specifically, variable length coded data are decoded and then predictively encoded data are decoded. That is, by adding the predictive error ($\Delta$) bij to the data of pixel aij, which was also transmitted, the pixel bij is decoded. Likewise, the pixel cij is decoded. Further, by using the predictive coefficient identified by the ID signal and the data of pixels aij, bij, and cij, the pixel dij is decoded. Likewise, the additional data are decoded. By using the code signal and the additional data which have been decoded, ADRC decoding is performed. Thereafter, the block order is restored to that of the original data.

Therefore, as described above, ADRC encoding is performed for each sub-block. Thereafter, the code signal and the additional data which have been generated by the ADRC encoding are predictively encoded. Thus, with the apparatus of the above-described embodiment of the present invention, a high compression ratio of data can be accomplished so that signals having a relatively large information or data content, such as high definition television signals, can be satisfactorily transmitted.

Another embodiment according to the present invention will now be described which utilizes orthogonal conversion encoding and predictive encoding.

Figure 4B:
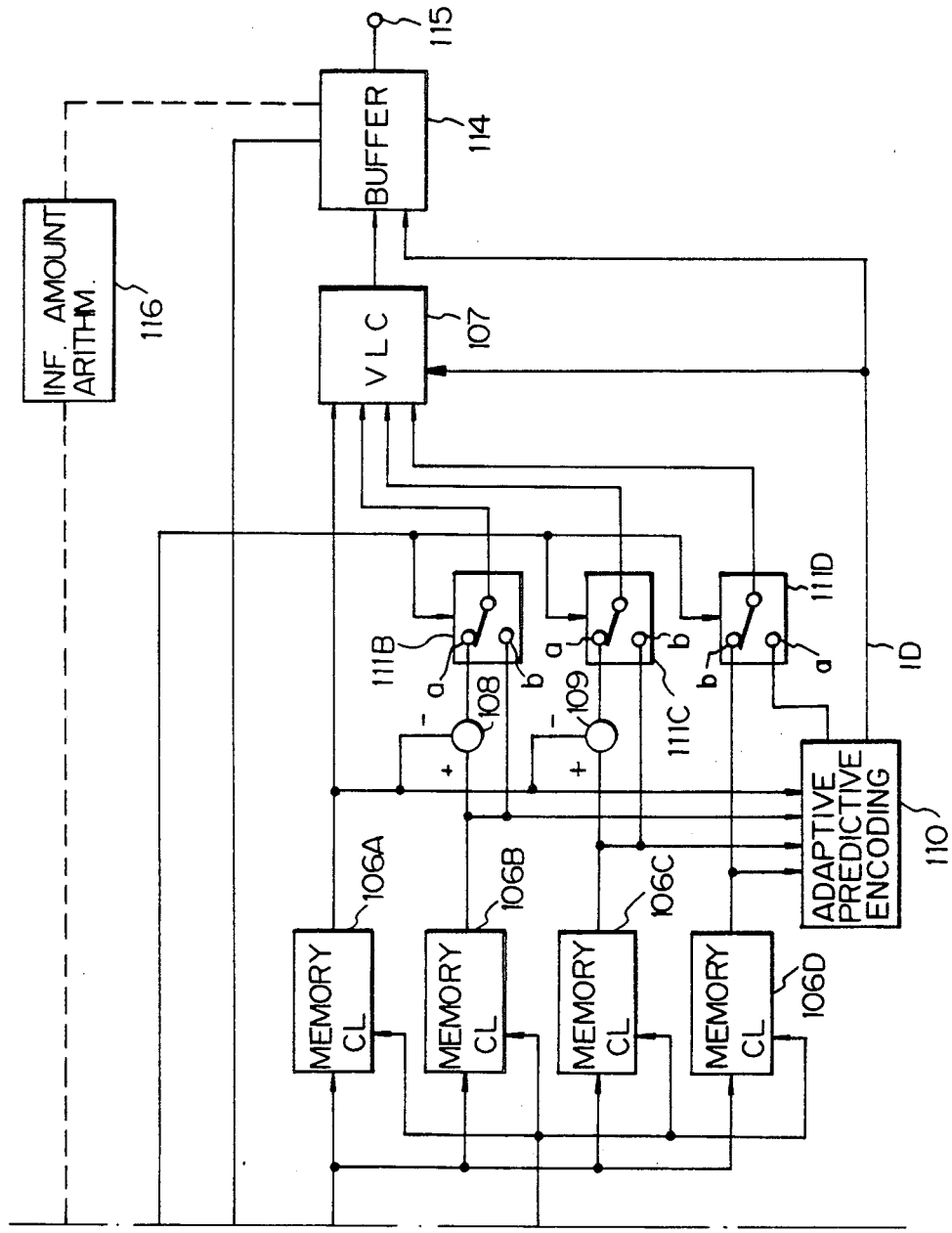
Figure 5A:
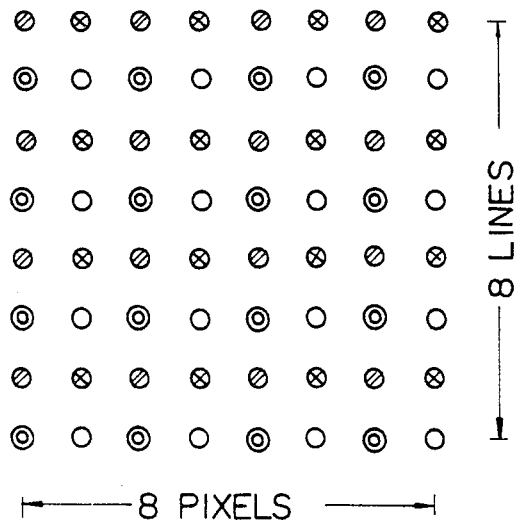
FIGS. 5A and 5B illustrate a block and a sub-block, respectively, used in the apparatus of FIGS. 4A and 4B.

FIG. 4 is a block diagram showing the structure of the apparatus according to the present embodiment. As shown therein, digital video data, in which each digitized data sample has 8 bits, are supplied through an input terminal 101 to a block segmentation circuit 102. A data array of the video data is transformed from a raster scan order or format to a block format by block segmentation circuit 102. For example, a screen of one frame or one field may be divided into a block of $(8 \times 8 = 64)$ pixels, as shown in FIG. 5A. An output signal of the block segmentation circuit 102 is supplied to a sub-block segmentation circuit 103 so as to form sub-blocks. As an example, the sub-block segmentation circuit 103 may form four sub-blocks, as shown in FIG. 5B, from the block shown in FIG. 5A.

Figure 5B:
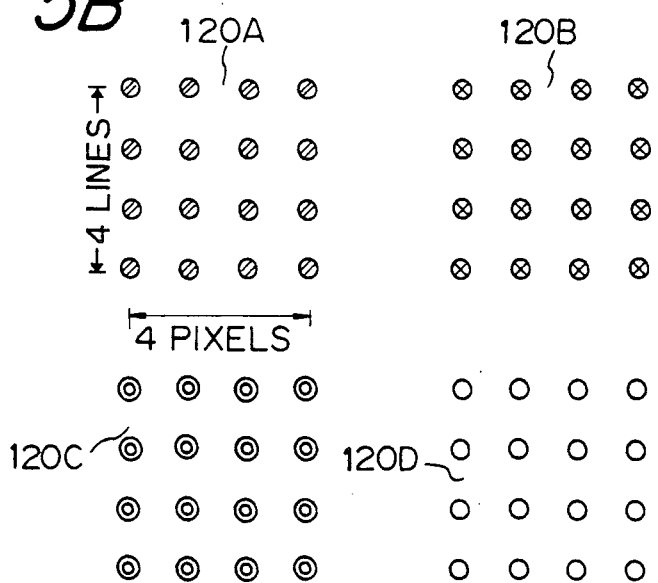

FIG. 5B shows the four sub-blocks 120A, 120B, 120C, and 120D formed from the block shown in FIG. 5A, in which each of these sub-blocks 120A, 120B, 120C and 120D has four pixels. The sub-block segmentation circuit 103 outputs pixel data in the order of 120A, 120B, 120C and 120D, that is, circuit 103 first outputs pixel data for the sub-block 120A and last outputs pixel data for the sub-block 120D. As an alternative to using separate independent circuits for the block segmentation circuit 102 and the sub-block segmentation circuit 103, a memory device may be used for forming sub-blocks of data from the input data.

103 is supplied to a transformer 104, whereupon each sub-block is 103 is sent to a transformer 104. Thus, each sub-block is DCT coded. The transformer 104 generates four-coefficient data which is equivalent to the number of pixels of each sub-block. The coefficient data are supplied to a requantizing circuit 105 so as to requantized the data into a particular number of bits. The requantizing circuit 105 outputs the requantized coefficient data for each sub-block in a zigzag scan order.

Figure 6A:
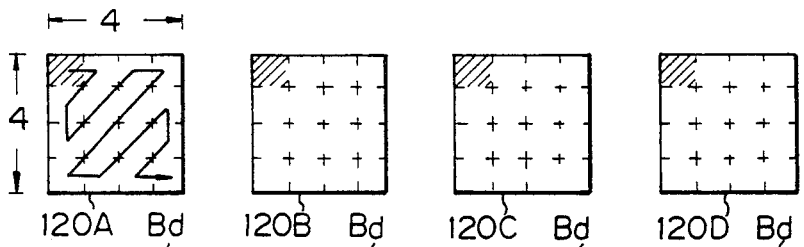
FIGS. 6A, 6B and 6C are diagrams to which reference will be made in describing an encoding process of coefficient data.

FIG. 6A is a diagram showing the coefficient data of sub-blocks 120A to 120D, in which the coefficient data represented with hatched lines is a DC component. Starting with the coefficient data of the DC component, the coefficient data of the sub-block 120A are outputted from the requantizing circuit 105 in the zigzag scan. In a likewise manner, the coefficient data of the sub-block 120B is then outputted. Thereafter, the coefficient data of the sub-blocks 120C and 120D are successively outputted. This coefficient data from the requantizing circuit 105 are supplied to memories 106A, 106B, 106C and 106D, as hereinafter described. These memories 106A to 106D are cleared block by block with a clear pulse supplied from the block segmentation circuit 102.

Figure 6B:
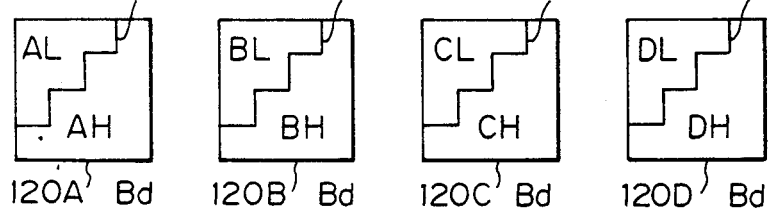

Further, as shown in FIG. 6B, a boundary Bd may be set for dividing coefficient data of each sub-block into six-coefficient data on the low frequency side, including a DC component, and 10-coefficient data on the high frequency side. More specifically, the coefficient data on the low frequency side of the sub-block 120A is represented by AL whereas, on the other hand, the co-efficient data on the high frequency side is represented by AH. Likewise, the coefficient data of the sub-block 120B is divided into coefficient data BL and BH; the sub-block 120C into coefficient data CL and CH; and the sub-block 120D, into coefficient data DL and DH.

The coefficient data of AL, BL, CL, and DL on the low frequency side of the boundary Bd are predictively encoded. On the other hand, the coefficient data of AH, BH, CH, and DH on the high frequency side of the boundary Bd are not predictively encoded and, instead, the original coefficient data are supplied to a variable length coding circuit 107. These operations are so performed due to the following reasons. That is, the correlation of the coefficient data on the low frequency side of each sub-block is stronger than that on the high frequency side. In addition, the coefficient data on the high frequency side is much smaller than that on the low frequency side. Thus, although the coefficient data on the high frequency side are not predictively encoded, the amount in which this data is compressed is nevertheless satisfactory.

The coefficient data of the sub-block 120A from the requantizing circuit 105 are written to the memory 106A. An output signal read from the memory 106A is supplied to the variable length coding circuit 107 which, for example, may utilize a run-length Huffman encoding or the like. Thereafter, the coefficient data of the sub-block 120B from the requantizing circuit 105 are written to the memory 106B. The coefficient data read from the memory 106A are further supplied to a subtraction circuit 108. Coefficient data read from the memory 106B, in synchronization with the coefficient data read from the memory 106A, are also supplied to the subtraction circuit 108. The subtraction circuit 108 subtracts the coefficient data from the memory 106A from that from the memory 106B so as to obtain a predictive error which is supplied to an input terminal "a" of a switching circuit 111B. The coefficient data from the memory 106B are further supplied to an input terminal "b" of the switching circuit 111B. The switching circuit 111B selects one of the inputs supplied thereto and outputs the same to the variable length coding circuit 107.

Likewise, the coefficient data of the sub-block 120C from the requantizing circuit 105 are written to the memory 106C. The coefficient data from the memory 106A are further supplied to a subtraction circuit 109. Coefficient data read from the memory 106C, in synchronization with the coefficient data read from the memory 106A, are also supplied to the subtraction circuit 109. The subtraction circuit 109 subtracts the coefficient data from the memory 106A from that from the memory 106C so as to obtain a predictive error which is supplied to an input terminal "a" of a switching circuit 111C. The coefficient data from the memory 106C are further supplied to an input terminal "b" of the switching circuit 111C. The switching circuit 111C selects one of the inputs supplied thereto and outputs the same to the variable length coding circuit 107.

In addition, the coefficient data of the sub-block 120D are written to the memory 106D. The coefficient data read from the memory 106D and that read from the memories 106A, 106B, and 106C are supplied to an adaptive predictive encoding circuit 110. The adaptive predictive encoding circuit 110 generates a predictive error and an ID signal for identifying an optimum predictive coefficient. The predictive error from the predictive encoding circuit 110 is supplied to an input terminal "a" of a switching circuit 111D. The coefficient data from the memory 106D are further supplied to an input terminal "b" of the switching circuit 111D. An output being selected by the switching circuit 111D and the ID signal are sent to the variable length coding circuit 107.

The switching operation of the switching circuits 111B, 111C and 111D is controlled in accordance with the aforementioned boundary Bd by an output signal of a timing generation circuit 112. More specifically, a sub-block period clock signal from the sub-block segmentation circuit 103 and a clock signal, in synchronization with the coefficient data, from a terminal 113 are supplied to the timing generation circuit 112. As a result of receiving these signals, the timing generation circuit 112 generates a control signal which goes high when the coefficient data on the low frequency side of the boundary Bd are processed and goes low when the coefficient data on the high frequency side of the boundary Bd are processed. Therefore, as is to be appreciated, while the control signal is high, each of the switching circuits 111B, 111C, and 111D selects the predictive error from the respective input terminal "a". On the other hand, while the control signal is low, each of the switching circuits 111B, 111C and 111D selects the coefficient data from the respective input terminal "b".

An output signal from the variable length coding circuit 107 and the ID signal from the adaptive predictive encoding circuit 110 are supplied to a buffer circuit 114. Data to be transmitted are obtained at an output terminal 115 of the buffer circuit 114. The buffer circuit 114 monitors the amount of data being generated and forms a control signal for controlling the width of the quantizing step of the requantizing circuit 105 so as to maintain the amount of data being generated constant. More specifically, when the amount of data being generated is large, the width of quantizing step is increased. On the other hand, when the amount of data being generated is small, the width of quantizing step is decreased.

Along with the width of the quantizing step, it is also possible to control the threshold value of the coefficient data in the buffer circuit 114.

Figure 6C:
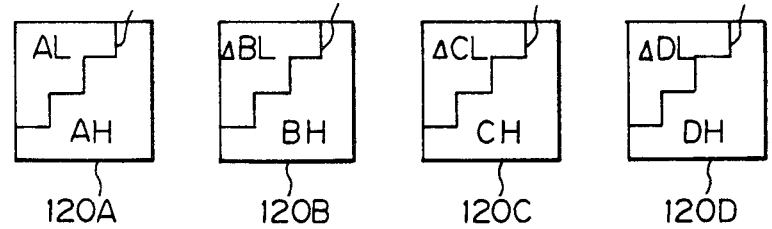

The predictive encoding will now be described. When predictive values of the coefficient data of BL, CL, and DL on the low frequency side are BL', CL', and DL', respectively, the predictive encoding operation generates encoded outputs (($\Delta$) BL, ($\Delta$) CL, and ($\Delta$) DL) as shown in FIG. 6C. In other words, the predictive errors generated in the subtraction circuits 108 and 109 and the adaptive predictive encoding circuit 110 can be expressed by the following equations:

$$(\Delta)BL = BL - BL'$$

$$(\Delta)CL = CL - CL'$$

$$(\Delta)DL = DL - DL'$$

in which, $$BL' = AL$$

$$CL' = AL$$

$$DL' = (\alpha)AL + (\beta)BL + (\gamma)CL$$

These arithmetic operations are performed for the six-coefficient data having the same position on the low frequency side of each sub-block. For example, the DC component of the sub-block 120A is used as a predictive value of the DC component of the sub-block 120B. More specifically, in the block shown in FIG. 5A, the pixels of the sub-blocks 120B and 120C are respectively located at a more right position by one sample and a lower position by one line than the pixels of the sub-block 120A. As a result, there is relatively strong correlation between these pixel data such that the coefficient data AL can be used as a predictive value of the coefficient data of BL and CL. However, since the pixels of the sub-block 120D are respectively located at lower and oblique positions relative to those of the sub-block 120A, the correlation between the sub-blocks 120A and 120D is normally weaker than that among the sub-blocks 120A, 120B, and 120C. Thus, for a predictive value of the sub-block 120D, the coefficient data of the sub-blocks 120A, 120B and 120C are respectively multiplied by predictive coefficients ($\alpha$), ($\beta$), and ($\gamma$) and then added together. The resultant value is used as a predictive value DL'.

Figure 7:
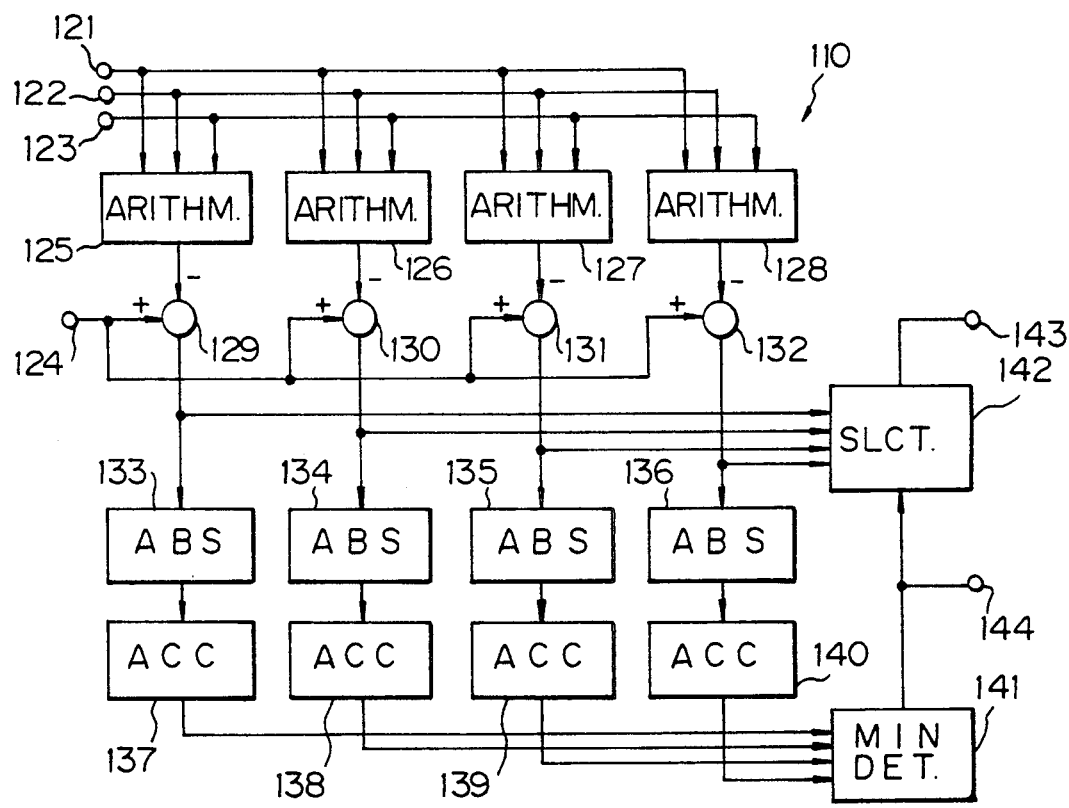
FIG. 7 is a block diagram of an adaptive predictive encoding circuit.

FIG. 7 is a block diagram of the adaptive predictive encoding circuit 110 in accordance with another embodiment. The coefficient data of AL, BL, CL and are respectively supplied to input terminals 121, 122, 123 and 124. Coefficient data from each of the input terminals 121, 122 and 123 are sent to arithmetic circuits 125, 126, 127 and 128, whereupon predictive values are formed with different predictive coefficients. In other words, the following predictive values are respectively obtained from the arithmetic circuits 125 to 128:

$$DL'1 = (\alpha)1AL + (\beta)1BL + (\gamma)1CL$$

$$DL'2 = (\alpha)2AL + (\beta)2BL + (\gamma)2CL$$

$$DL'3 = (\alpha)3AL + (\beta)3BL + (\gamma)3CL$$

$$DL'4 = (\alpha)4AL + (\beta)4BL + (\gamma)4CL$$

The following are examples of predictive coefficients:

$$((\alpha)1 = -0.5, (\alpha)2 = 0, (\alpha)3 = 0, (\alpha)4 = -1.0),$$

$$((\beta)1 = 0.75, (\beta)2 = 0, (\beta)3 = 1.0, (\beta)4) = 1.0),$$

and $((\gamma)1 = -0.75, (\gamma)2 = 1.0, (\gamma)3 = 0, (\gamma)4 = 1.0.$

The above predictive values are respectively compared with the true value DL from the input terminal 124 in subtraction circuits 129, 130, 131 and 132. Differential outputs, or predictive errors, from the subtraction circuits 129 to 132 are respectively transformed into absolute values in absolute value forming circuits 133, 134, 135 and 136 and then supplied to accumulators 137, 138, 139 and 140. These accumulators 137 to 140 accumulate the predictive errors in absolute values with respect to the four coefficients. A minimum value of the outputs of the accumulators 137 to 140 is detected with a minimum value detection circuit 141, whereupon the minimum value detection circuit generates a 2-bit ID signal for identifying the predictive coefficient corresponding to the minimum value, as hereinafter described.

The predictive errors outputted from the subtraction circuits 129 to 132 are further supplied to a selector 142. The selector 142 holds the predictive errors in accordance with the four types of predictive coefficients and selects one of the predictive errors in accordance with the ID signal supplied from the minimum value detection circuit 141. Thus, the predictive error obtained by using the predictive coefficient which produces the value closest to the true value is selected by the selector 142.

At output terminals 143 and 144 of the selector 142, the predictive error ($\Delta$) DL and the ID signal are respectively obtained.

Further, the boundary Bd designating the coefficient data to be predictively decoded with respect to the sub-blocks may be adaptively changed. More specifically, as shown by the dashed lines of FIG. 4, predictively encoded outputs (($\Delta$) BL, BH, ($\Delta$) CL, CH, ($\Delta$) DL, and DH) are sent from the buffer circuit 114 to an information amount arithmetic circuit 116. The information amount arithmetic circuit 116 determines the boundary Bd for minimizing the total of the absolute values of the above mentioned predictively encoded outputs and then generates a control signal accordingly which is supplied to the timing generation circuit 112. The timing generation circuit 112 then generates a switching control signal in which the relative length of the high level period low level period is controlled in response to the control signal from the information amount arithmetic circuit 116.

Moreover, on the decoding side (not shown in the figures), the variable length code data are decoded. Thereafter, by adding the respective predictive error to the coefficient data of the sub-block 120A, the coefficient data of sub-blocks 120B and 120C are decoded. In addition, by using the predictive coefficients specified with the ID signal, the coefficient data of the sub-block 120D are decoded. In the next stage, by utilizing a reverse converting DCT process, the original image data can be obtained.

Therefore, as described above, by predictively encoding coefficient data of the low frequency component, whose correlation is relatively strong, which are obtained by DCT encoding, the data can be highly compressed.

Furthermore, although preferred embodiments of the present invention have been described in detail herein with reference to the accompanying drawings, it is to be understood that the invention is not limited to these precise embodiments, and that various changes and modifications can be effected therein by one skilled in the art without departing from the scope or spirit of the invention as defined in the appended claims.

What is claimed is:

1. A highly efficient encoding apparatus for encoding digital video data, said apparatus comprising:

block segmentation means for receiving said digital video data in a raster scan format and for transforming the received data into a format having blocks of pixel data;

first encoding means for receiving said blocks of pixel data and for encoding and compressing the pixel data in each of said blocks into an approximately constant amount of encoded and compressed data in accordance with a control signal;

second encoding means for predictively encoding and further compressing said encoded and compressed data outputted from said first encoding means and including means for generating said control signal in accordance with the amount of predictively encoded and further compressed data; and means for outputting said predictively encoded and further compressed data from said second encoding means.

2. A highly efficient encoding apparatus as set forth in claim 1; in which said first encoding means includes detection means for detecting a maximum value and a minimum value of said pixel data for each of said blocks, means for determining dynamic range information for each of said blocks by using said maximum and minimum values from said detection means, subtraction means for normalizing said pixel data and requantizing means for requantizing normalized pixel data from said subtraction means in accordance with said dynamic range information and said control signal.

3. A highly efficient encoding apparatus as set forth in claim 1; in which said first encoding means includes orthogonal conversion means for orthogonally converting said pixel data in each of said blocks to respective coefficient data, and requantizing means for requantizing said coefficient data from said orthogonal conversion means in accordance with said control signal; and in which said second encoding means includes predictive encoding means for predictively encoding requantized coefficient data of at least one of said blocks from the requantized coefficient data of another of said blocks, switching means for selecting an output of one of said predictive encoding means and said requantizing means, and variable length encoding means for encoding an output of said switching means.

* * * * *